Jan. 10, 1961

R. A. WISE 2,967,981

LIGHT SENSITIVE CONTROL CIRCUIT

Filed April 15, 1958

Inventor:
Robert A. Wise,
by Laurence R. Kempton
His Attorney.

United States Patent Office 2,967,981
Patented Jan. 10, 1961

2,967,981

LIGHT SENSITIVE CONTROL CIRCUIT

Robert A. Wise, Asheboro, N.C., assignor to General Electric Company, a corporation of New York Filed Apr. 15, 1958, Ser. No. 728,693

6 Claims. (Cl. 317—124)

This invention relates to control systems associated with light sensitive cells, and in particular to a circuit controlled by the level of illumination.

One object of this invention is to provide a load control circuit, actuated by a light sensitive cell, which is extremely sensitive to the illumination level present.

A second object of this invention is to provide a load control circuit wherein the inherent properties of a photo conducting cell are utilized to operate the circuit when the illumination level falls or rises.

Still another object of this invention is to provide a light-actuated load control circuit wherein positive operation is assured, even though caused by extremely slow change in light intensity.

In carrying out the objects of my invention in one form thereof, I utilize a relay having an operating coil and normally closed control and load switches. The normally closed switches are actuated to their open position when the coil is energized to the relay pick up level. The coil is energized by means including a photo conductive cell responsive to light and is deenergized when the level of illumination decreases. An impedance circuit including the control switch is connected in series with the coil, thereby increasing current through the coil to slightly less than pick up level when the control switch is closed so that the coil is energized to pick up level upon a slight increase in illumination.

In accordance with another aspect of this invention, a capacitor is connected across the control switch, so that when the coil is energized to its minimum relay pick up level through the cell, opening the control switch, the charging current drawn by the capacitor completes the pick up of the relay.

Other objects and advantages of my invention will become apparent as the following description proceeds, and the features of novelty which characterize my invention will be pointed out with particularity in the claims annexed to and forming part of this specification.

Figure 1:
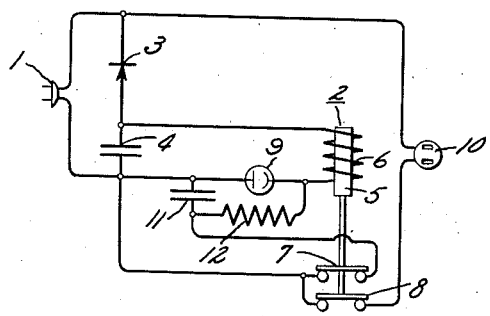
Fig. 1 is a wiring diagram of my light sensitive control circuit.

As can be seen in Fig. 1, power is supplied to my light sensitive control circuit by means of a plug 1. In the preferred embodiment of my invention, I use a direct current relay 2 and in order to supply D.C. voltage to relay 2, I utilize a half wave rectifier 3 and a filtering capacitor 4. It should be understood that an A.C. relay may be used in my circuit thereby eliminating rectifier 3 and capacitor 4. However, to construct an A.C. relay, which would operate quietly, requires considerable time and expense and the additional cost of a shading coil on the relay core. By using a D.C. relay, I obtain quiet operation at considerably less cost. Relay 2 is preferably a high sensitivity D.C. relay, having a core 5 and a coil 6.

Normally closed control switch 7 and normally closed load switch 8 are actuated by relay 2.

Figure 2:
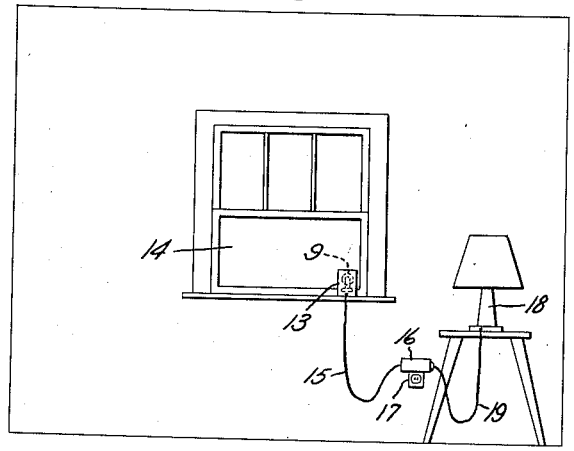
Fig. 2 is a diagrammatic view showing how my control circuit may be used to control a lamp.

Referring again to the preferred embodiment of my invention, I prefer to use a cadmium sulphide photo conductive cell 9; however, it should be understood that other types of photo conductive cells will function properly in my circuit. During daylight hours when normal illumination is striking photo cell 9 and the circuit is connected to a source of 110 volt 60 cycle household power, relay coil 6 is energized and switches 7 and 8 will be open. Under these conditions, with load switch 8 open, the circuit to outlet 10 is open and substantially all of the D.C. relay coil current is flowing through photo cell 9. As night approaches, or when the level of illumination striking photo cell 9 falls to a predetermined low value, the resistance of photo cell 9 increases to a very high value. A point is reached where the cell resistance becomes great enough to limit current flow so that sufficient current does not flow through relay coil 6 to hold core 5 in the actuated position. At this point, the relay opens and switches 7 and 8 close. It can now be seen that power is supplied through load switch 8 to outlet 10 to energize any load device which is connected to outlet 10. Referring once again to the preferred embodiment, the load device connected to outlet 10 may be a lamp 18 as shown in Fig. 2, so that my circuit will function as a night light control circuit.

When control switch 7 closes due to the relay opening, it shorts out capacitor 11 and connects resistor 12 in parallel with photo cell 9. The resultant parallel circuit of photo cell 9 and resistor 12 reduces the total resistance of the circuit and increases the current flowing through coil 6. In a typical embodiment of my invention, I make resistor 12 a .2 megohm resistor. The resistance of photo cell 9, when dark enough to cause the relay 2 to be opened, is higher than is the resistance of resistor 12 which is connected in parallel with cell 9 when switch 7 closes. Because the resistance of a parallel circuit is less than the smallest resistance in the circuit the total resistance in the circuit decreases to a value less than that of resistor 12 when switch 7 closes.

While the resultant decrease in total resistance of the circuit results in an increase in current through coil 6, relay 2 will not become activated at this time. The current flowing through coil 6 when switch 7 closes is greater than the current flowing through coil 6 at the time relay 2 became deenergized. However, the drop out current is not nearly as high as the pick up level current, so relay 2 will not become actuated.

In the morning when the level of illumination striking photo cell 9 increases, the resistance of cell 9 is reduced to a much lower value than its resistance when no illumination or a very limited amount of illumination was striking the cell. The reduction will cause the total resistance of the parallel circuit of cell 9 and resistor 12 to decrease causing an increase of current through coil 6. When this increased current is equal to the pick up level current, relay 2 becomes actuated. When relay 2 is energized, switches 7 and 8 are open. When switch 8 opens, the circuit to outlet 10 and the load connected thereto is broken. In a typical embodiment of my invention the load connection to outlet 10 would be a lamp, and when morning comes the circuit to the lamp would be broken thereby turning the lamp off.

When switch 7 opens, capacitor 11 is reconnected in series with resistor 12. Capacitor 11 typically may be in the order of 0.1 microfarad. Capacitor 11 is utilized to complete and insure the pick up of relay 2 without chatter and thereafter to reduce current flow through the relay coil. When coil 6 is energized to its minimum relay pick up level through cell 9 and resistor 12, control switch 7 initially opens, resulting in an instantaneous decrease in current flow through coil 6, tending to immediately cause the relay to deenergize. Without capacitor 11, relay chatter would be likely. With capacitor 11, however, relay 2 will not chatter when this occurs because when switch 7 opens, the charging current drawn by capacitor 11 through resistor 12 will hold the coil 6 current relatively steady long enough to complete the pick up of the relay 2. Soon after the relay has become completely closed the charging current into capacitor 11 decreases to a negligible amount. However, the drop out current now required to just maintain relay 2 in an energized position is much lower than the minimum relay pick up level. Therefore, coil 6 will remain energized until the level of illumination striking cell 9 again decreases very slightly below the level of illumination at which relay pick up initially occurred.

In Fig. 2 I have shown one way in which my control circuit may be utilized to function as a night light control. Cell 9 is mounted within a box or other suitable structure 13. Typically, housing 13 is positioned on the sill of a window 14 so that the only illumination which will be able to strike cell 9 must come from outside the window. Cell 9 is connected by means of a cable 15 to box 16 which houses the remaining components of my control circuit and which is adapted to be connected to the wall outlet 17. Lamp 18 is connected by a cord 19 to box 16.

It can therefore be seen, that in the manner previously described when night approaches and the level of illumination striking cell 9 decreases, power will be supplied to lamp 18 to illuminate a room of a residence or the like. Also, in the manner previously described, when the illumination level striking cell 9 increases, the circuit to lamp 18 is opened, disconnecting the lamp from the source of power.

While I have shown and described a preferred embodiment of my invention, I do not desire my invention to be limited to the particular construction shown and described and I intend by the appended claims to cover all modifications coming within the true spirit and scope of this invention.

What I claim as new and desire to secure by Letters Patent of the United States is:

1. A light actuated load control device comprising: a source of D.C. power; a relay including an operating coil and normally closed control and load switches; a photo conductive cell connected in series with said coil across said power source; a high impedance control circuit including said control switch in electrical parallel with said cell; and a capacitor in electrical parallel with said control switch; energization of said coil to its minimum relay pick up level through said coil opening said control switch; whereupon charging current drawn by said capacitor completes pick up of said relay.

2. A light actuated load control device comprising a source of direct current power; a relay having an operating coil and normally closed control and load switches; said switches being actuated to open position when said coil is energized to pick up level; a photo conductive cell connected in series with said coil across said power source; means including said cell to energize said coil responsive to light and deenergize said coil when the level of illumination decreases; a high impedance control circuit including said control switch in electrical parallel with said cell and electrical series with said coil to increase the current through said coil to slightly less than pick up level when said control switch is closed; and a capacitor in electrical parallel with said control switch; energization of said coil to its minimum pick up level through said cell opening said control switch whereupon charging current drawn by said capacitor completes pick up of said relay.

3. A light actuated load control device comprising: a source of electrical power; a relay including an operating coil and normally closed control and load switches; a photo conductive cell connected in series with said coil across said power source; a high impedance control circuit including said control switch in electrical parallel with said cell; and a capacitor in electrical parallel with said control switch; energization of said coil to its minimum relay pick up level through said coil opening said control switch; whereupon charging current drawn by said capacitor completes pick up of said relay.

4. A night light control circuit comprising: a source of electrical power; a relay having an operating coil and a normally closed control switch; said switch being actuated to open position when said coil is energized to pick up level; means including a photo conductive cell connected in series with said coil and said power source to energize said coil responsive to light and deenergize said coil when the level of illumination decreases; an impedance circuit including said switch interposed in electrical series with said coil and in parallel with said photo conductive cell to increase the current through said coil to slightly less than pick up level when said control switch is closed; and a capacitor in electrical parallel with said switch; energization of said coil to its minimum relay pick up level through said coil opening said control switch; whereupon charging current drawn by said capacitor completes pick up of said relay.

5. A night light control circuit comprising: a relay having an operating coil and a normally closed control switch; a rectifier circuit to supply direct current to the coil of said relay; said switch being actuated to open position when said coil is energized to pick up level; means including a photo conductive cell interposed in said circuit in series with said coil to energize said coil responsive to light and deenergize said coil when the level of illumination decreases; an impedance circuit including said switch interposed in electrical series with said coil and in parallel with said cell to increase the current through said coil to slightly less than pick up level when said switch is closed; and a capacitor in electrical parallel with said switch; energization of said coil to its minimum pick up level through said cell opening said switch whereupon charging current drawn by said capacitor completes pick up of said relay.

6. A light actuated load control device comprising: means defining a direct current power supply circuit; a relay including an operating coil and load and control switches respectively actuated from closed to open positions upon energization of said coil to at least its minimum pickup level; a photo conductive cell; a main control circuit including said photo conductive cell and said operating coil in electrical series to energize said relay when said cell become conductive upon illumination thereof; and an auxiliary control circuit including an electrical capacitance also in electrical series with said operating coil when said control switch is open, said electrical capacitance being short circuited when said control switch is closed, whereby charging current flowing in said auxiliary control circuit upon initial opening of said control switch assists completion of relay actuation initiated by said main control circuit.

References Cited in the file of this patent

UNITED STATES PATENTS

| Re. 19,199 | Knowles | June 5, 1934 |
| 2,774,015 | White | Dec. 11, 1956 |